United States Patent [19]

Furuse et al.

[11] 4,012,214
[45] Mar. 15, 1977

[54] METHOD OF MAKING A COLD CATHODE GAS LASER DISCHARGE TUBE

[75] Inventors: Takao Furuse; Akira Kuroiwa; Sadatane Sakuma, all of Tokyo, Japan

[73] Assignee: Nippon Electric Company, Ltd., Tokyo, Japan

[22] Filed: Aug. 15, 1975

[21] Appl. No.: 605,144

[30] Foreign Application Priority Data

Aug. 19, 1974 Japan .................. 49-94717

[52] U.S. Cl. .................. 65/34; 29/25.16; 65/42; 65/59 A; 313/220; 316/20
[51] Int. Cl.² .................. C03C 29/00; C03B 23/20
[58] Field of Search .................. 65/3, 4, 42, 59 A; 29/25.16; 313/220; 316/20

[56] References Cited

UNITED STATES PATENTS

| | | | |
|---|---|---|---|
| 2,181,240 | 11/1939 | Kimble | 65/42 X |
| 2,204,217 | 6/1940 | Herriger | 65/42 X |
| 2,683,333 | 7/1954 | Canicoba | 65/42 X |
| 2,784,284 | 3/1957 | Zunick | 65/59 A X |
| 3,495,119 | 2/1970 | Kolb | 313/220 X |
| 3,851,272 | 11/1974 | Shull et al. | 313/220 X |

*Primary Examiner*—Robert L. Lindsay, Jr.
*Attorney, Agent, or Firm*—Ostrolenk, Faber, Gerb & Soffen

[57] ABSTRACT

Use of press-molded flanged glass envelope members each including a central hollow cylindrical portion enables fabrication of high output cold cathode gas laser tubes of reduced axial length with materially reduced cost of production. The cylindrical portion of one of the envelope members surrounds one end region of the capillary tube thereby to prevent discharge concentration on the adjacent end region of the cylindrical cold cathode while that of the other envelope member serves to support the capillary tube at about the middle of its axial length, eliminating the need for a "flaring operation" requiring highly skilled labor.

2 Claims, 2 Drawing Figures

4,012,214

METHOD OF MAKING A COLD CATHODE GAS LASER DISCHARGE TUBE

BACKGROUND OF THE INVENTION

This invention relates to cold cathode gas laser tubes and more particularly to methods of making high output cold cathode gas laser tubes of reduced size.

Generally, with cold cathode gas laser tubes, typically of the structure including a capillary discharge tube and a hollow cylindrical cold cathode arranged in coaxial partly overlapping relation therewith, the laser light output obtainable increases with the length of the capillary discharge tube. This means that, in order to increase the light output of such laser tubes, the length of the capillary tube used therein should be increased as much as possible. Further, with laser tubes of the type concerned, it is necessary to prevent any discharge concentration on one axial end region of the cylindrical cold cathode which may result in breakage thereof. This requirement may be met, for example, by terminating the capillary tube some distance axially inward from the open end of the cylindrical cold cathode, but this will result in a corresponding decrease in the laser output. On the other hand, in cases where the capillary tube terminates in a position to cause discharge concentration on the cathode end, for example, extending axially beyond the cylindrical cold cathode, use of a tubular capillary-tube overlapping member effective to change the path of discharge extending directly between the adjacent ends of the capillary tube and the cylindrical cold cathode compulsively into one extending between the capillary tube end and an axially inward wall surface of the cold cathode is desirable as it not only is effective to prevent cathode breakage but makes it possible to realize a high output cold cathode gas laser tube with its length fully utilized. Such tubular overlapping member must be supported in the outer envelope of the laser structure in coaxial relation with the capillary tube and the cylindrical cold cathode and necessitates the provision of an appropriate annular supporting flange to serve the purpose. Previously, however, such supporting flange has been formed manually by a so-called "flaring" technique that requires highly skilled labor and much time, causing a substantial rise in cost of fabrication.

SUMMARY OF THE INVENTION

Accordingly, the present invention has for its object the provision of a novel method of making a cold cathode gas laser tube which enables production of high output cold cathode gas laser tubes of minimized axial length at substantially reduced cost.

A distinguishing feature of the method of the present invention is that the necessity of any "flaring" step, requiring highly skilled labor, in the process of fabricating laser tubes is completely eliminated by the preparation of press-molded envelope members of a configuration substantially corresponding to an integral combination of a tubular capillary-tube overlapping member and a supporting flange therefor.

The present invention will next be described in detail with reference to the accompanying drawings.

DESCRIPTION OF THE PREFERRED EMBODIMENTS

Figure 1:
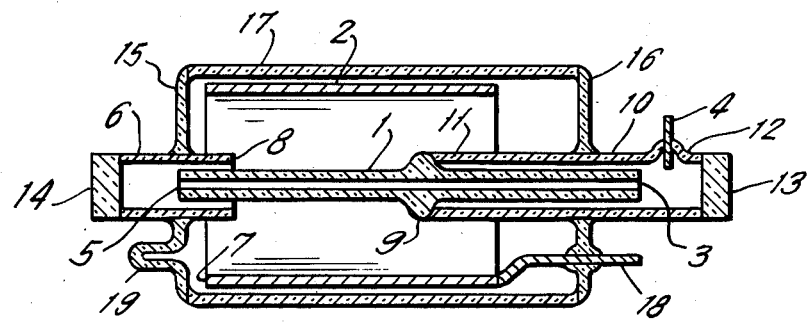
FIG. 1 is a longitudinal axial cross section of a cold cathode gas laser discharge tube fabricated by the conventional method.

Description will first be made of the structure of a compact high output cold cathode gas laser tube and of the conventional method of making the same, with reference to FIG. 1, which illustrates, an example of gas laser tubes of the internal mirror type.

As illustrated, the laser tube includes a capillary glass tube 1 arranged coaxially with a tubular cold cathode electrode 2 and extending at its opposite ends axially beyond the cold cathode. Specifically, one end 3 of the capillary tube 1 is placed adjacent to an anode electrode 4 located in one axial end region of the laser structure while the other end 5 of the capillary tube is inserted in a tubular capillary-tube overlapping member 6 which has an internal diameter larger than the external diameter of capillary tube 1. The open end region 8 of tubular overlapping member 6, which surrounds the adjacent end region 5 of capillary tube 1, extends an appropriate distance into the cold cathode electrode 2 to prevent discharge concentration at the adjacent open end 7 thereof. Thus, the structure illustrated has the same effect as that obtainable by terminating the end region 5 of capillary tube 1 within the cold cathode and is also effective to give an increased laser output.

The capillary tube 1 is formed substantially at the middle of its axial length with an annular boss or flange 9 of limited size for connection with a tube supporting structure. Namely, a tubular capillary-tube supporting member 10 is arranged about the capillary tube 1 coaxially therewith and sealed at one open end 11 to the flange 9 on the capillary tube 1 to support it substantially at its axial center. The tubular supporting member 10 is fitted at the other open end 12 with a mirror 13 and a pin-like anode electrode 4 is inserted in that wall region of tubular supporting member 10 which lies between the mirror 13 and the adjacent end 3 of capillary tube 1. The tubular supporting member 10 and tubular overlapping member 6, which is also provided at its outer end with a mirror, as indicated at 14, are both supported by an outer glass envelope 17 through the medium of respective "flares" 15 and 16.

There are various known forms of structure for supporting a capillary tube in a glass envelope. It is desirable, however, to support the capillary tube at the middle of its axial length or at a point as close thereto as possible, considering the effect of thermal expansion of the capillary tube upon its straightness. In cases where the capillary tube is supported at two spaced points, it must be supported movably at least at one of the two points and this inevitably makes fabrication of laser tubes very difficult and results in a substantial increase in cost of production. Under these circumstances, it is considered highly desirable to support a capillary tube at the middle of its length by means of a tubular support such as indicated at 10 in FIG. 1.

With the tube structure illustrated, however, "flares" 15 and 16 serving to support the tubular capillary-tube overlapping and supporting members 6 and 10, respectively, must be formed manually by a so-called "flaring" procedure, which necessitates highly skilled labor, as pointed out hereinbefore. For example, "flare" 16 is formed on the tubular supporting member 10 in the following manner. First, a glass tube of a predetermined length is fit over the tubular support 10 and fused at one end thereto in an appropriate axial position relative thereto. Subsequently, while rotating the tubular support 10 about the axis thereof, the glass tube thereon is heated at the other end by burner means and radially expanded progressively into the desired flare or annular flange form by means of a trowel. The time required for such flaring is about four times that for fusing glass tubes to each other and has been the most dominant of factors precluding reduction of fabrication cost. Moreover, insertion of a cold cathode supporting terminal member 18 into the flare 16 and the formation of an exhaust tube 19 on the flare 15, can only be effected after the flaring has been completed and this has made the whole process of fabricating laser tubes very complicated.

Description will next be made of the method of the present invention, which eliminates the need for any flaring procedure in the fabrication process, with reference to FIG. 2, which illustrates a high output cold cathode gas laser tube of reduced axial length and basically of the same configuration as that shown in FIG. 1.

Figure 2:
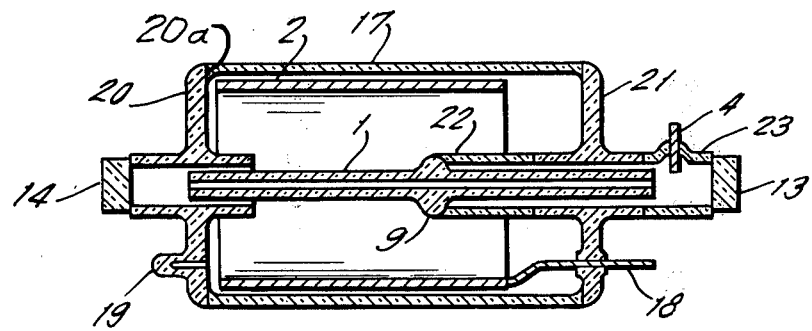
FIG. 2 is a cross section, similar to FIG. 1, of a cold cathode gas laser discharge tube made by the method of the present invention.

In FIG. 2, reference numerals 20 and 21 indicate respective integral glass envelope members prepared principally by press molding according to the present invention. As observed, one of the two envelope members, 20, corresponds in configuration to an integral combination of tubular capillary-tube overlapping member 6, flare 15 and exhaust nipple 19 of the laser structure shown in FIG. 1, while the other envelope member 21 corresponds in configuration to an integral combination of tubular capillary-tube supporting member 10, flare 16 and cold cathode supporting terminal member 18. The process of preparing these glass envelope members will be briefly described below.

First, a press mold, for example, formed of carbon, is employed to form finely divided glass into moldings each having an aperture to receive cold cathode supporting terminal 18 or exhaust nipple 19. The glass moldings are then baked, with exhaust nipple 19 or supporting terminal 18 fitted in the aperture formed in the respective glass molding, to obtain desired glass envelope members 20 and 21.

Subsequently, a hollow cylindrical glass tube 22 of the same diameter as the central hollow cylindrical portion of glass envelope member 21 is fused to the cylindrical portion at one end thereof, as illustrated. Fused to the other end of the cylindrical portion of glass envelope member 21 is another hollow cylindrical glass tube 23 which is the same in diameter as glass tube 22 and which is provided with an anode electrode 4, which extends through a wall port portion of the glass tube 23, as illustrated. Then, a capillary glass tube 1 with an annular boss or flange 9 formed substantially at the middle of the length thereof is inserted axially into the assembled structure through the glass tube 22, which in turn is fused at its outer end to the capillary tube 1 through the intermediary of the flange 9 formed thereon. Incidentally, the glass tube 22 need not always be prepared as a separate unit but may be molded jointly with the envelope member 21 as an integral extension of the central hollow cylindrical portion thereof. Only, in this case, a separate mold must be prepared for press-molding the envelope member 21.

After the capillary tube 1 has been fused to the glass tube 22 and thus supported therethrough on the envelope member 21, a hollow cylindrical cold cathode electrode 2, prepared separately, is secured at one end to the cold cathode supporting terminal member 18 as by welding to complete a first integral subassembly of the laser tube, including first glass envelope member 21, capillary tube 1 and cold cathode 2.

It will be apparent that, if required, two or more supporting terminals such as illustrated at 18 may be employed to support the cold cathode 2.

On the other hand, a hollow cylindrical glass member 17, prepared separately to serve as a tubular body portion of the laser envelope, is heat-sealed or fused at one end to the outer peripheral edge of the annular disc flange portion of second glass envelope member 20 as at 20a, to complete a second subassembly of the laser tube.

Then, the hollow cylindrical glass envelope member 17, forming part of the second subassembly, is heat-sealed at its outer end to the outer peripheral edge of the annular disc flange portion of first glass envelope member 21, forming part of the first subassembly and finally, mirror structures 13 and 14 are fixed to the outer end of the central hollow cylindrical portion of the glass tube 23 and envelope member 20, respectively, to complete a desired gas laser structure.

It will be readily appreciated from the foregoing description that, according to the method of the present invention, high output cold cathode gas laser tubes reduced in axial length with use of a tubular capillary-tube overlapping member in the form of a hollow cylindrical portion of the second press-molded glass envelope member, 20, can be fabricated with increased ease and efficiency on a mass production basis and that the capillary tube can now be advantageously supported at the middle of its axial length by means of a tubular capillary-tube supporting member formed as a hollow cylindrical portion of the first press-molded glass envelope member, 21, without necessitating any complicated manual operation including a so-called flaring procedure and insertion of a cold cathode supporting terminal or terminals and the formation of the exhaust tube into the flare so formed. In one practical application of the present invention, it has been found that a cost reduction amounting to about one-third the previous cost of laser tubes can readily be attained.

Though the present invention has been described herein principally in connection with laser tubes of the internal mirror type, it will be apparent to those skilled in the art that the invention is also applicable to external mirror type laser tubes with successful results and that it also contemplates fabrication of various modified forms of laser tubes, for example, emloying a cylindrical anode electrode in place of the pin-like one illustrated.

What is claimed is:

1. A method of making a cold cathode gas laser discharge tube of reduced size, comprising the steps of:
preparing a capillary glass tube having a substantially straight longitudinal axis; an anode electrode; a first envelope member consisting of a first hollow cylindrical glass portion having an internal diameter larger than the external diameter of said capillary glass tube, a first annular disc flange portion of glass extending radially from said hollow cylindrical glass portion intermediate the ends thereof and at least one electrode supporting terminal member extending through said first annular disc flange portion, said first hollow cylindrical glass portion and said first annular disc flange portion being formed jointly by press molding; a second envelope member consisting of a second hollow cylindrical glass portion having an internal diameter larger than the external diameter of said capillary glass tube and a second annular disc flange portion of glass extending radially from said second hollow cylindrical glass portion intermediate the ends thereof, said second hollow cylindrical glass portion and said second annular disc flange portion being formed jointly by press molding; a hollow cylindrical cold cathode electrode having an internal diameter larger than the external diameter of said first and second hollow cylindrical glass portions, respectively, of said first and second envelope members; and a hollow cylindrical glass envelope member having an internal diameter larger than the external diameter of said hollow cylindrical cold cathode electrode;

heat-sealing said anode electrode to one end region of said first hollow cylindrical glass portion of said first envelope member;

inserting said capillary glass tube into said first hollow cylindrical glass portion through the other end region thereof to such an extent that said capillary glass tube terminates at the leading end thereof axially short of said anode electrode;

heat-sealing said capillary glass tube to said first hollow cylindrical glass portion at the axial end thereof remote from said anode electrode while holding said capillary glass tube in substantially coaxial relation with said first hollow cylindrical glass portion;

securing said hollow cylindrical cold cathode electrode at one axial end thereof to the adjacent end of said electrode supporting terminal member so that the axis of said cathode electrode is substantially coaxially aligned with the axis of said capillary glass tube;

heat-sealing said annular disc flange portion of said second envelope member to said hollow cylindrical glass envelope member at one end thereof while holding the adjacent end region of said second hollow cylindrical glass portion inserted in said hollow cylindrical cold cathode electrode;

heat-sealing said annular disc flange portion of said first envelope member to said hollow cylindrical glass envelope member at the other end thereof with the end region of said capillary glass tube remote from said anode electrode inserted in said adjacent end region of said second hollow cylindrical glass portion in substantially coaxial relation therewith;

sealingly securing optical window members to the respective axially outer ends of said first and second hollow cylindrical glass portions thereby to complete a gas-tight structure enclosing said capillary glass tube and said hollow cylindrical cold cathode electrode; and sealing an ionizable gas in the interior space of said gas-tight structure.

2. The method of claim 1 further comprising the step of forming a nipple configuration in the flange of one of said glass members to provide for subsequent evacuation and filling of the completed enclosure.

* * * * *